Aug. 14, 1951    C. J. ADAMS ET AL    2,563,904
FIRE DETECTING SYSTEM
Filed May 19, 1949

INVENTORS
Charles J. Adams
John A. Proctor
BY
L. F. Hammard
Atty

Patented Aug. 14, 1951

2,563,904

UNITED STATES PATENT OFFICE 2,563,904

FIRE DETECTING SYSTEM

Charles J. Adams, Park Ridge, and John A. Proctor, Chicago, Ill., assignors to American Phenolic Corporation, Chicago, Ill., a corporation of Illinois Application May 19, 1949, Serial No. 94,221

9 Claims. (Cl. 177—311)

This disclosure is a division of our application for Letters Patents on a Fire Detector, Serial Number 94,222, filed on even date herewith, and the present invention relates to a fire detecting system designed to utilize a number of the differentially balanced temperature sensing units there disclosed, yet to so position and arrange these units as to insure detection of any fire, even under such extreme or abnormal circumstances as might prevent or delay the functioning of a single detecting unit.

The systems here disclosed are particularly suited to use with detecting units as described and claimed in our copending application, but since the present invention may utilize variations of the structure there disclosed or even be useful with entirely different types of sensing devices, it is believed pertinent to point out that the present invention contemplates any type of detecting unit employing a pair of temperature sensing devices extending into spaced apart zones, particularly when the two sensing devices are balanced against each other so that they may undergo any changes in ambient temperature without actuating a signal, but will give a signal (preferably by closing an electrical alarm circuit) whenever the difference in temperature between the sensing devices exceeds a predetermined amount.

As pointed out in our copending disclosure, a differential detector constructed in this manner is unaffected by wide variations in ambient temperature, yet will give an almost instant indication if a fire breaks out, since at its origin any fire is localized and will normally affect only one of the temperature sensing arms. It is conceivable, however, that a fire might break out at a point equidistant from the two opposite arms of the detector, or that two fires might occur simultaneously in the spaced apart zones to which the detector arms extend and it is, therefore, the general aim of this disclosure to provide a system arranged to give a reliable alarm signal in such an eventuality.

It is to be recognized, of course, that the mathematical probability of two fires of equal size and intensity breaking out in spaced apart zones of any given installation at almost the same exact moment is so small as to be almost disregarded, yet when human lives are endangered as they are in the event of an aircraft fire, it is important to avoid even an extremely improbable contingency. It is, therefore, a primary object of the present invention to provide a system so designed that persons who may know their lives depend upon the proper functioning of the apparatus may rest assured that even the most remote possibilities of failure have been guarded against.

The teachings of this disclosure may be practiced in several somewhat different ways, and various installations have been illustrated in the drawings of the present application to show typical examples of installations suited to specific purposes, but in general it may be said that the essential feature of the invention resides in the arrangement of a plurality of differentially balanced double arm fire detecting units so located and oriented with respect to each other that a localized fire cannot occur at any point where it will equally affect the differential sensing devices of all of the detectors employed. This is accomplished according to one teaching of the invention by mounting a single detecting unit with its sensing arms extending oppositely from a bulkhead or baffle, and in other arrangements the result is accomplished by employing a plurality of identical detecting units arranged in line, with each detector having at least one of the sensing arms of another detector partially overlapping it and extending into proximity with the differential housing.

Typical installations of fire detecting systems according to the present teachings are illustrated in the drawings of this specification, wherein.

Figure 3:
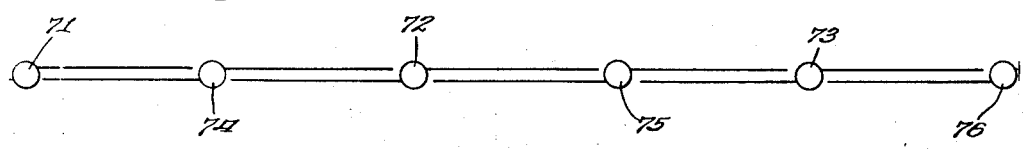
Figure 4:
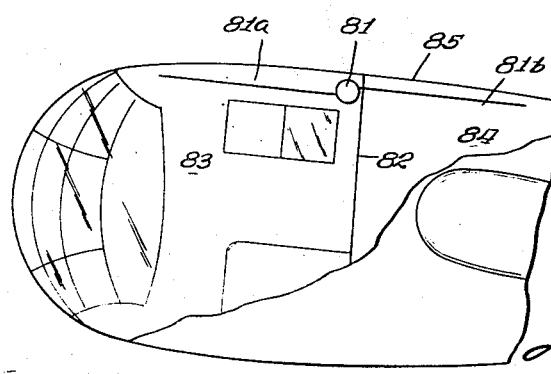

Figure 3 is a diagrammatic illustration of a plurality of differential fire detecting units in a straight-line installation such as might be suited to other applications, as in protection of the interior of buildings, etc.; and Figure 4 is a diagrammatic illustration of a detector installation utilizing a central baffle or bulkhead to prevent the possibility of any fire exerting an equal effect on both arms of a single detecting unit.

Figure 1:
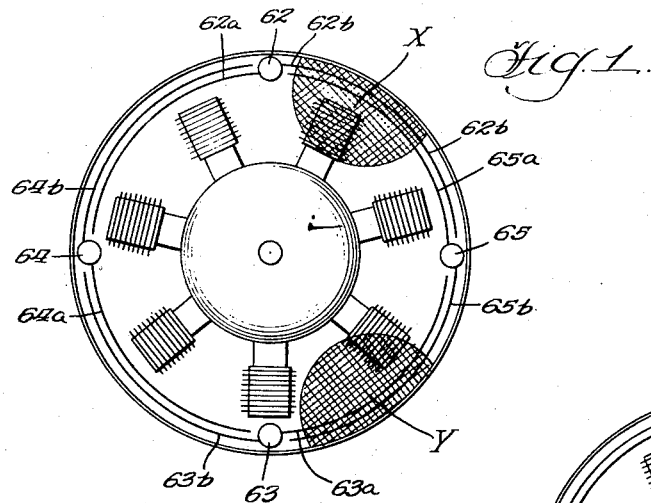
Figure 1 is a diagrammatic illustration of an installation arranged for the engine compartment of a radial aircraft engine, the view being shaded to indicate a condition that would pertain if two equal fires broke out simultaneously at spaced apart locations within the compartment.
Figure 2:
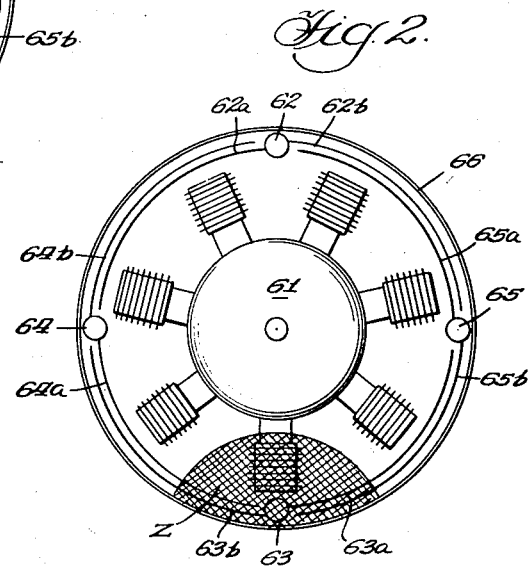
Figure 2 is a diagrammatic illustration similar to Figure 1 illustrating the condition that would exist if a single fire should break out at the precise point where its effect upon the two opposite arms of a given differential fire detecting unit would be equal.

In Figures 1 and 2 the radial engine 61 of the aircraft is protected by four detecting units, 62, 63, 64, and 65, each of which has a pair of continuous temperature sensing arms extending in opposite directions. These arms are indicated as 62a, 62b; 63a, 63b; 64a, 64b; 65a and 65b respectively. Ordinarily the installation is made with these arms in close proximity to the engine and within the cowling 66 which ordinarily encircles the entire engine mechanism.

It will be seen from this illustration that the installation proposes an arrangement where the engine is encircled by two overlapping systems of temperature sensing arms, yet with the total length of each detector only partially overlapped by any other single unit. The arms 62a and 62b coact with the arms 63a and 63b to form one substantially continuous circle or line around the engine compartment, while the arms 64a and 64b coact with the arms 65a and 65b to provide a second parallel system. Each detector is overlapped along half of its length by two other detectors, one on each side. By this expedient the system will not only function on the outbreak of a localized fire at any point about the circumference of the motor, but will even give a dependable and prompt indication in the rare case in which two fires might break out simultaneously. That is, if we assume that a fire breaks out in the shaded zone X, it will be clear that it will raise the temperature of the arms 62b and 65a without materially influencing the temperature of the arms 62a and 65b, with the result that both of these detectors will function to give an alarm. In the event, however, that a fire develops in the zone X and a second fire of equal size and intensity develops at the same moment in the shaded zone Y, the opposite arms 65a and 65b of detector 65 might conceivably be heated equally, with the result that this detector would fail to give a signal. With the arrangement shown, however, a dependable signal is assured even in this eventuality. This is because, even assuming that the fires X and Y might balance the single detecting unit 65, each fire would nevertheless differentially affect another unit. The fire in the zone X would heatt he arm 62b in a manner not balanced by the arm 62a with the result that the detector 62 would close an alarm circuit. Similarly, the fire in the zone Y would raise the temperature of the sensing arm 63a above the temperature of its mating arm 63b so that this detector would also function.

In the event of a fire occurring at the exact center point of a given detector, as indicated by the shaded fire zone Z of Figure 2, it is apparent that while the fire might conceivably be balanced so well as to affect the arms 63a and 63b equally, yet the fire even at this location would raise the temperature of the arms 65b and 64a without equally affecting the arms 65a and 64b, with the result that the detectors 64 and 65 would both function to given an alarm signal.

In other types of installations, for example in building constructions, etc., the same effect may be accomplished by arranging the units in line, with each detector in partial overlapping offset relation with those at either side of it, as shown in Figure 3. Here the detectors 71, 72, 73, 74, 75, and 76 are each overlapped by two others, so that a fire occurring at any point along the length of the figure will be unbalanced with respect to at least two of the individual detecting units.

In Figure 4 the desired effect is accomplished by mounting a single detector unit with its differential housing 81 at a fire wall or bulkhead 82 that acts as a flame baffle to separate a forward compartment 83 from the rear compartment 84 in such a manner that the forward sensing unit 81a and the rear sensing unit 81b are isolated from each other. When so isolated, a flame cannot affect the two arms equally, no matter what the location of the flame. In an installation of this character it will be noted that the two arms will be equally affected by normal changes in ambient temperatures such as might occur as a result of external weather conditions or the effects of bright sun on the exterior surface 85 of the aircraft, yet if a fire breaks out in the forward compartment it will affect only the sensing unit 81a, and if it breaks out in the aft compartment it will affect only the arm 81b. It follows that in either case the baffle 82 prevents the possibility of a flame raising the temperatures of the two differential arms equally and thus makes for the dependable functioning of the system.

From the foregoing it will be apparent that by the teachings of this invention it is possible to arrange differentially balanced temperature sensing units in such a manner that they cannot fail to perform their function, even in the event of the occurrence of an extremely unlikely eventuality, and that in normal operation the systems disclosed herein provide a double safeguard by so arranging the detecting units with respect to each other that a fire at any given location will cause at least two of the detecting units to close an alarm circuit.

Having thus described the invention, what we claim as new and desire to protect by United States Letters Patent is:

1. A fire detecting system comprising a plurality of fire detecting units, each unit having a housing with a pair of continuous temperature sensing arms differentially balanced against each other and extending in different directions from the housing, said units being positioned in partial overlapping relation with at least one temperature sensing arm of a remote unit extending into the proximity of the housing of each unit.

2. A fire detecting system comprising a plurality of fire detecting units, each unit having a pair of temperature sensing devices spaced apart in different zones and differentially balanced against each other; said units being positioned in partial overlapping relation with a temperature sensing device of at least one remote unit extending into each of said zones.

3. A fire detecting system comprising a plurality of fire detecting units, each unit having a housing with a pair of elongated temperature sensing arms differentially balanced against each other and extending in different directions from the housing, said units being positioned in partial overlapping relation with at least one temperature sensing arm of a remote unit extending into the proximity of the housing of each unit.

4. A fire detecting system comprising a plurality of fire detecting units, each unit having a housing with a pair of continuous temperature sensing arms differentially balanced against each other; the housings being spaced apart and the arms of each unit extending in different directions from the housing to a point in proximity with the housing of another unit; with the arms of each adjacent unit lying in closely spaced relation along their entire length.

5. A fire detecting system comprising a plurality of fire detecting units, each unit having a housing with a pair of continuous temperature sensing arms differentially balanced against each other; the housings being spaced apart and the arms of each unit extending in different directions from the housing to a point in proximity with the housing of another unit.

6. A fire detecting system comprising a plurality of fire detecting units, each unit having a housing with a pair of elongated temperature sensing arms; the housings being spaced apart and the arms of each unit extending in different directions from the housing to a point in proximity with the housing of another unit; with the arms of each adjacent unit lying in closely spaced relation along their entire length.

7. A fire detecting system comprising a plurality of fire detecting units, each unit having a housing with a pair of elongated temperature sensing arms; the housings being spaced apart and the arms of each unit extending in different directions from the housing to a point in proximity with the housing of another unit.

8. A fire detecting system comprising a plurality of fire detecting units, each unit having a pair of temperature sensing devices spaced apart and extending into different zones with a single temperature sensing device of another unit extending into only one of said zones.

9. A fire detecting system comprising a plurality of fire detecting units, each unit having a pair of temperature sensing devices spaced apart and extending into different zones with a single temperature sensing device of each of two other units extending into each of said zones.

CHARLES J. ADAMS.
JOHN A. PROCTOR.

REFERENCES CITED

The following references are of record in the file of this patent:

UNITED STATES PATENTS

| Number | Name | Date |
|---|---|---|
| 2,088,485 | Schoepf | July 27, 1947 |
| 2,444,421 | Boston | July 6, 1948 |
| 2,456,499 | Fritzinger | Dec. 14, 1948 |